(12) United States Patent
Ricketts et al.

(10) Patent No.: US 10,375,881 B2
(45) Date of Patent: Aug. 13, 2019

(54) AGRICULTURAL MACHINE WITH SECTIONAL HEADER

(71) Applicant: CNH Industrial America LLC, New Holland, PA (US)

(72) Inventors: Jonathan E. Ricketts, Coal City, IL (US); Craig D. Roberts, Denver, PA (US)

(73) Assignee: CNH Industrial America LLC, New Holland, PA (US)

( * ) Notice: Subject to any disclaimer, the term of this patent is extended or adjusted under 35 U.S.C. 154(b) by 130 days.

(21) Appl. No.: 15/603,021

(22) Filed: May 23, 2017

(65) Prior Publication Data

US 2018/0338418 A1 Nov. 29, 2018

(51) Int. Cl.
| | |
|---|---|
| *A01B 73/00* | (2006.01) |
| *A01D 34/28* | (2006.01) |
| *A01D 41/14* | (2006.01) |
| *A01D 41/06* | (2006.01) |
| *A01D 101/00* | (2006.01) |

(52) U.S. Cl.
CPC ............ *A01D 34/283* (2013.01); *A01B 73/00* (2013.01); *A01D 41/06* (2013.01); *A01D 41/14* (2013.01); *A01D 41/144* (2013.01); *A01D 2101/00* (2013.01)

(58) Field of Classification Search
CPC .... A01D 34/283; A01D 41/06; A01D 41/144; A01D 2101/00; A01D 75/002; A01B 73/00–067
See application file for complete search history.

(56) References Cited

U.S. PATENT DOCUMENTS

| | | | |
|---|---|---|---|
| 3,324,637 A | | 6/1967 | Ashton et al. |
| 3,888,189 A | * | 6/1975 | Bass .................... A01D 75/002 410/31 |
| 4,329,833 A | * | 5/1982 | Witzel ................. A01D 75/002 56/15.3 |

(Continued)

FOREIGN PATENT DOCUMENTS

| | | |
|---|---|---|
| DE | 20 2008 005 596 U1 | 9/2008 |
| EP | 1 021 944 A1 | 7/2000 |

(Continued)

OTHER PUBLICATIONS

European Patent Office, Munich Extended European Search Report, dated Oct. 18, 2018.

*Primary Examiner* — Robert E Pezzuto
*Assistant Examiner* — Adam J Behrens
(74) *Attorney, Agent, or Firm* — Peter K. Zacharias; Patrick M. Sheldrake

(57) ABSTRACT

An agricultural vehicle including a chassis and a sectional header system carried by the chassis. The sectional header system includes a center section connected to the chassis and having a pair of lateral ends, at least one additional section, and at least one coupling assembly. The at least one coupling assembly includes at least one actuator and at least one connector. The at least one coupling assembly removably connects the center section to the at least one additional section. The at least one additional section is coupled to the center section in harvesting of a crop material and the at least one additional section is decoupled from the center section in transportation of the sectional header system.

20 Claims, 4 Drawing Sheets

(56) References Cited

U.S. PATENT DOCUMENTS

| | | | | |
|---|---|---|---|---|
| 4,346,909 A | * | 8/1982 | Hundeby | A01B 73/005 |
| | | | | 172/248 |
| 4,385,483 A | * | 5/1983 | McIlwain | A01D 75/002 |
| | | | | 56/15.2 |
| 4,409,780 A | * | 10/1983 | Beougher | A01B 73/02 |
| | | | | 172/456 |
| 4,415,174 A | * | 11/1983 | Koehn | A01D 75/30 |
| | | | | 172/314 |
| 4,910,946 A | | 3/1990 | Underwood | |
| 5,671,595 A | * | 9/1997 | Burmann | A01D 41/14 |
| | | | | 56/119 |
| 5,845,472 A | * | 12/1998 | Arnold | A01D 41/144 |
| | | | | 56/94 |
| 6,209,297 B1 | * | 4/2001 | Yeomans | A01B 73/005 |
| | | | | 56/14.9 |
| 7,197,865 B1 | | 4/2007 | Enns et al. | |
| 7,926,249 B1 | * | 4/2011 | Cook | A01B 73/005 |
| | | | | 172/240 |
| 8,292,328 B2 | * | 10/2012 | Honas | A01D 75/002 |
| | | | | 280/769 |
| 8,769,920 B2 | * | 7/2014 | Patterson | A01D 43/06 |
| | | | | 56/228 |
| 9,386,748 B2 | | 7/2016 | Cook et al. | |
| 9,706,707 B2 | * | 7/2017 | Enns | A01D 41/142 |
| 9,918,430 B2 | * | 3/2018 | Roberge | A01D 41/144 |
| 2014/0033670 A1 | | 2/2014 | Cressoni | |
| 2018/0310462 A1 | * | 11/2018 | Chen | A01B 73/00 |

FOREIGN PATENT DOCUMENTS

| | | | | |
|---|---|---|---|---|
| FR | 3023675 A1 | | 1/2016 | |
| GB | 2079573 A | * | 1/1982 | A01D 41/06 |

* cited by examiner

AGRICULTURAL MACHINE WITH SECTIONAL HEADER

FIELD OF THE INVENTION

The present invention relates to agricultural vehicles, and, more particularly, to agricultural harvesters which include a header.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, and an unloading system, e.g., an unloading auger, on the combine is actuated to transfer the grain into the vehicle.

A typical header includes one or more cutters, e.g., cutter bars with reciprocating knives, which cut the crop material that is harvested from the field. Once the crop material is cut, a conveyor system, which is positioned rearwardly of the cutter(s), catches the crop material and transports it to the feeder housing. The header may also include a rotating reel with tines or the like to sweep the crop material towards the cutter(s). Modern headers generally have cutters and attachments which are specifically optimized to harvest a particular kind of crop material.

Harvesting efficiency is an impetus of combine innovation. In order to increase harvesting efficiency, headers are continually designed to be wider to harvest more crop material in a single pass. Decreasing the number of passes and the overall harvesting time involved leads to increased harvesting efficiency. However, there are numerous factors constraining the design of large header widths. Some factors limiting the working width of the header include the ease of interchanging different headers depending on the crop material and various transportation constraints. The interchangeability between different headers can be rather burdensome for a user as the larger headers are more cumbersome to maneuver. Additionally, some of the larger headers cannot be interchanged expeditiously at the harvesting site. For large headers with a working width greater than the width of the combine, various transportation issues may arise when the header is transported from the point of sale or from one harvesting site to another. Some of the issues of transportation may include affects on the operator and other drivers on the roadway, the efficiency of hauling the header, the costs associated with transportation, and the wear and tear on the header during transportation due to its increased wingspan and weight.

With respect to transportation, public roadway regulations limit the width of any vehicle traveling on a public roadway. As larger headers have widths that are usually significantly greater than the allowed parameters, the headers typically cannot be carried by the combine on public roadways. It is known to transport a header lengthwise along its longitudinal axis using a separate transport trailer. It is also known to transport a header using a set of transport wheels that are permanently affixed to the header. However, transport trailers increase the cost incurred by the user, and regardless of costs, numerous headers now exceed the length and load bearing capacity of many transport trailers currently on the market. Headers equipped with their own transport wheels increase the cost of the overall system, and still the sheer size and weight of many headers render the use of the incorporated transport wheels impractical. Therefore, large headers may still pose issues even when the headers are transported via a separate trailer or with their own set of transport wheels.

What is needed in the art is an agricultural harvester that allows for greater header width and the ease of its transportation while still achieving the roadway requirements.

SUMMARY OF THE INVENTION

In accordance with an aspect of the present invention, there is provided a sectional header system with a center section and at least one additional section removably and pivotally coupled to the center section.

In accordance with another aspect of the present invention, an agricultural vehicle includes a chassis and a sectional header system carried by the chassis. The sectional header system includes a center section connected to the chassis and having a pair of lateral ends, at least one additional section, and at least one coupling assembly. The at least one coupling assembly includes at least one actuator and at least one connector. The at least one coupling assembly removably connects the center section to the at least one additional section. The at least one additional section is coupled to the center section in harvesting of a crop material and the at least one additional section is decoupled from the center section in transportation of the sectional header system.

In accordance with yet another aspect of the present invention, a sectional header system includes a center section having a pair of lateral ends, at least one additional section, and at least one coupling assembly. The at least one coupling assembly includes at least one actuator and at least one connector. The at least one coupling assembly removably connects the center section to the at least one additional section. The at least one additional section is coupled to the center section in harvesting of a crop material and the at least one additional section is decoupled from the center section in transportation of the sectional header system.

In accordance with still another aspect of the present invention, a method includes the steps of providing a sectional header system for an agricultural vehicle. The sectional header system includes a center section having a pair of lateral ends, at least one additional section, and at least one coupling assembly. The coupling assembly includes at least one actuator and at least one connector. The at least one coupling assembly removably connects the center section to the at least one additional section. The at least one additional section is coupled to the center section in a harvesting mode and the at least one additional section is decoupled from the center section in a transportation mode for transporting the sectional header system. The method includes the further steps of converting the sectional header system from the harvesting mode into the transportation mode by disconnecting the at least one additional section from the center section such that only the center section remains attached to the agricultural vehicle, and converting the sectional header system from the transportation mode into the harvesting mode by connecting the at least one additional section to the center section.

An advantage of the agricultural harvester described herein is that each header section can be easily transported.

Another advantage of the agricultural harvester described herein is that minimal assembly is required at the point of sale or upon arrival at a harvesting site.

Still another advantage of the agricultural harvester described herein is that multiple variations of header width may be achieved by having additional header sections coupled with a common center section.

BRIEF DESCRIPTION OF THE DRAWINGS

The above-mentioned and other features and advantages of this invention, and the manner of attaining them, will become more apparent and the invention will be better understood by reference to the following description of an exemplary embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
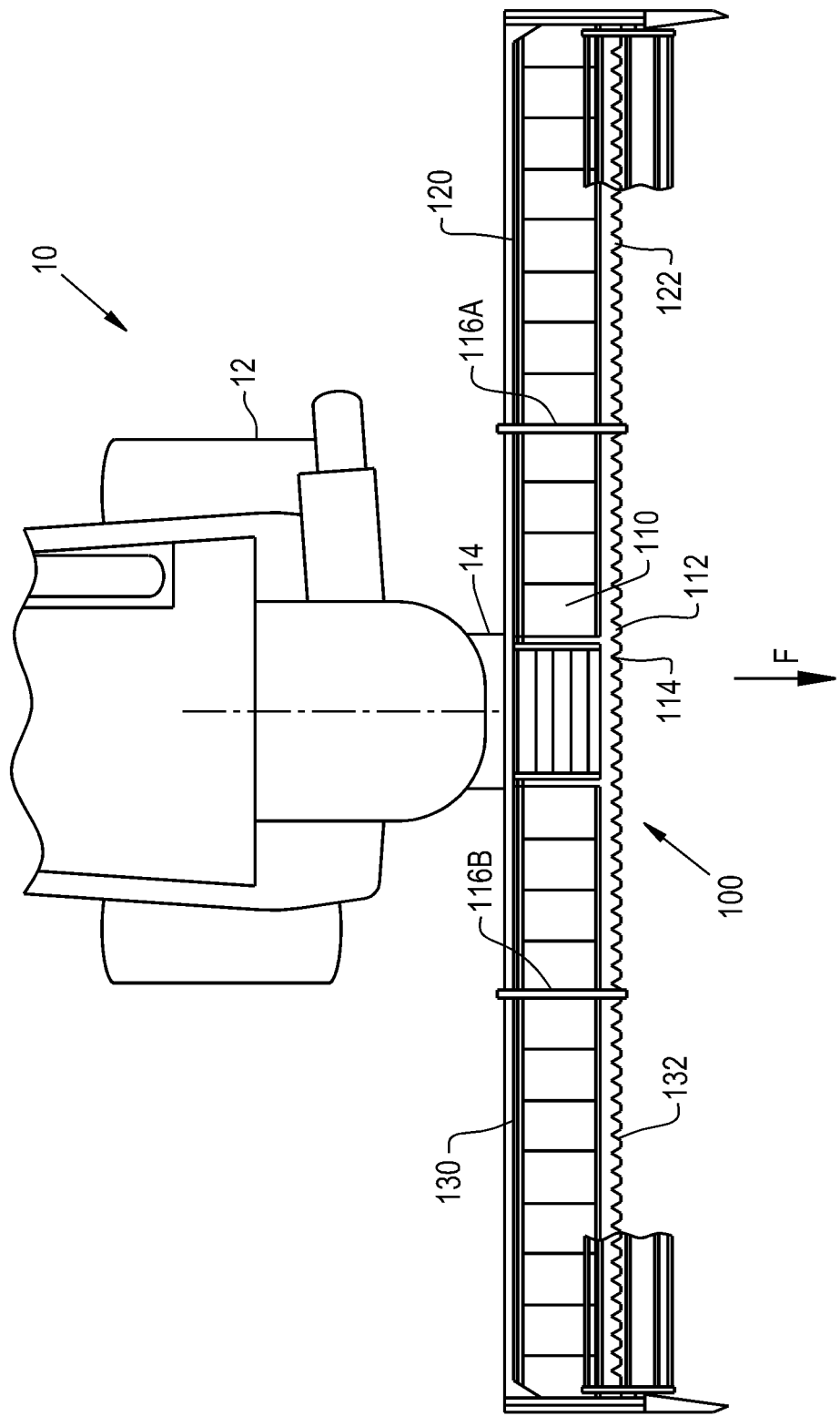
FIG. 1 is a top view of an agricultural vehicle with an assembled sectional header system in accordance with an exemplary embodiment of the present invention.

Referring now to the drawings, and more particularly to FIG. 1, there is shown an exemplary embodiment of an agricultural vehicle 10 in the form of a combine harvester which generally includes a chassis 12 and a sectional header system 100 carried by the chassis 12. Typically, the combine harvester 10 will include additional internal systems for the separation and handling of collected crop material, but these additional systems are omitted from view for brevity of description. It should be appreciated that the sectional header system 100 described and illustrated herein does not necessarily need to be included on combine harvesters, but can be incorporated in other agricultural vehicles such as windrowers.

The sectional header system 100 is a multipart header assembly that can be assembled for operational use for harvesting and dissembled for transportation. The sectional header system 100, shown assembled in FIG. 1, includes a center section 110 and two additional sections 120 and 130. The sectional header system 100 may however include only one additional section or multiple sections, for example four additional sections, attached to the center section 110.

The center section 110 supports one or more center cutters 112 with sharpened edges 114 to cut crop material as the agricultural vehicle 10 travels in a forward direction, denoted by arrow F. The center cutter 112 is a cutter bar, but other types of cutters can also be included in place of the cutter bar 112. As shown in FIG. 1, the center section 110 can be rigidly connected to the chassis 12 at a mount 14 of the agricultural vehicle 10, which typically is in the form of a feeder housing. The center section 110 has a pair of opposed lateral ends 116A and 116B.

The additional sections 120 and 130 are coupled to a respective lateral end 116A, 116B of the center section 110. As used herein, "coupled" signifies that each additional section 120, 130 is selectively and movably connected to the center section 110 such that the additional sections 120, 130 can be easily attached or detached and may pivot upwards relative to the center section 110, which is described in more detail further below. As used herein, "decoupled" refers to how each additional section 120, 130 is selectively and entirely disconnectable from the center section 110, as well as the agricultural vehicle 10, such that the additional sections 120, 130 can be subsequently towed, separately and/or jointly, by the agricultural vehicle 10 or another vehicle. The additional sections 120, 130 each support one or more additional cutters 122, 132, which can also be cutter bars similar to the cutter bar 112 supported by the center section 110. The additional sections 120, 130 are driven by the driveline at the lateral ends 116A, 116B of the center section 110, which may be accomplished by incorporating known drivelines with a PTO shaft.

As shown in FIG. 1, the center section 110 and additional sections 120, 130 include cutters 110, 122, 132 in the form of cutter bars. However, the sectional header system 100 may have a center section 110 and additional sections 120, 130 that do not include cutter bars. For example, the sectional header system 100 may be in the form of a corn header with sections 110, 120, 130 that respectively include snouts instead of cutter bars (not shown).

Figure 2:
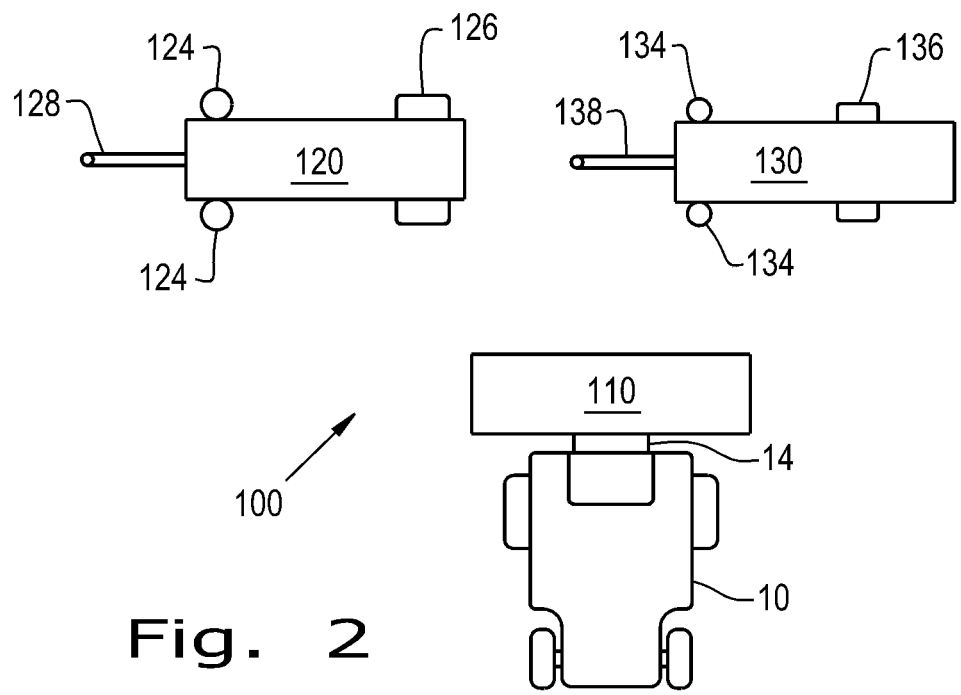
FIG. 2 is a top view of the agricultural vehicle with the sectional header system that is disassembled in accordance with the exemplary embodiment of the present invention.

Referring now to FIG. 2, there is shown a top view of the dissembled sectional header system 100. Each additional section 120, 130 includes a pair of support stabilizers 124, 134, a pair of transport wheels 126, 136, and a tongue 128, 138. The support stabilizers 124, 134 and transport wheels 126, 136 are respectively affixed to the frames of the additional sections 120, 130, and can be deployed and retracted depending upon whether the sectional header system 100 is configured for transportation or harvesting. The support stabilizers 124, 134, the transport wheels 126, 136, and/or the tongues 128, 138 may be automatically or manually extendable and retractable. The support stabilizers 124, 134 are shown to be in the form of two jacks 124, 134 on each additional section 120, 130 in the exemplary embodiment of the present invention. The jacks 124, 134 can be in the form of hydraulic, pneumatic, or screw jacks. The support stabilizers 124, 134 may also be in the form of a conventional stands, support wheels, or any other support means known in the art (not shown). It is conceivable to include one support stabilizer 124, 134 per additional section 120, 130. The transport wheels 126, 136 may be in the form of known folding transport wheels, including the folding wheel assemblies described in U.S. Pat. Nos. 7,926, 249 and 9,386,748, which are collectively owned by CNH Industrial America, LLC, and the disclosures of which are herein incorporated by reference. The tongues 128, 138 may be fixed, detachable, or retractable underneath the frames of the additional sections 120, 130, respectively. The additional section 120 may also include a winch system or a hitch at a rear portion of its frame in order to hook up the other additional section 130 for transport, or vice versa.

Figure 3:
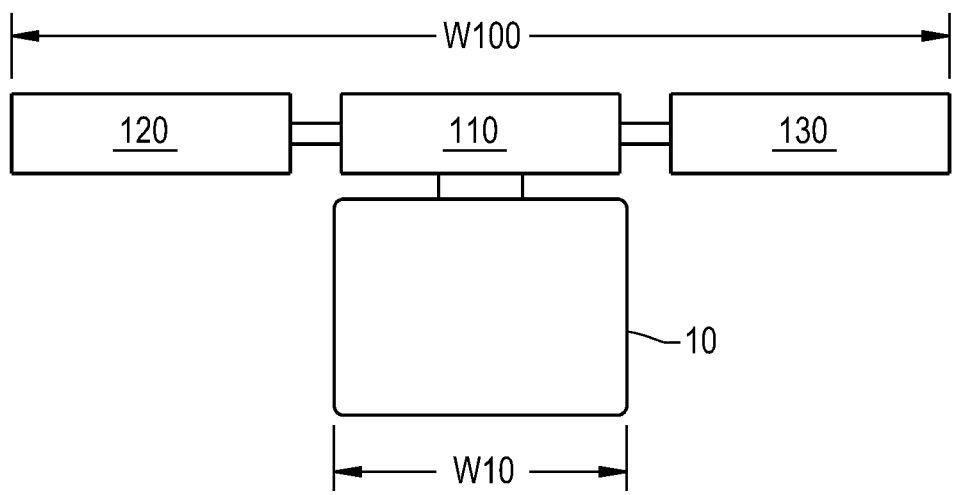
FIG. 3 is a schematic representation of the agricultural vehicle with the assembled sectional header system in accordance with the exemplary embodiment of the present invention.
Figure 4:
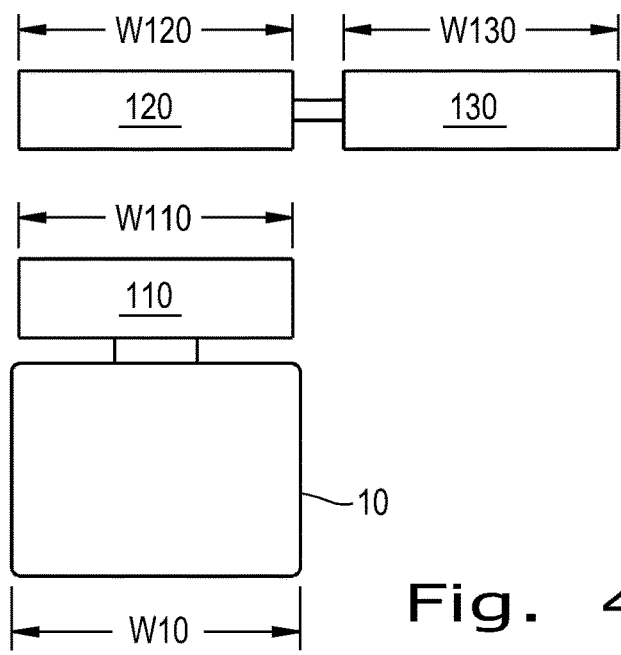
FIG. 4 is a schematic representation of the agricultural vehicle with the sectional header system that is disassembled for transport in accordance with the exemplary embodiment of the present invention.

Referring now to FIGS. 3 and 4, a schematic view of the combine harvester 10 is shown with the sectional header system 100 in a harvesting mode (FIG. 3) and a transport mode (FIG. 4), in accordance with the exemplary embodiment of the present invention. In the harvesting mode, the additional sections 120, 130 are coupled to the center section 110. It should be appreciated that the gaps illustrated in FIG. 3 between the additional sections 120, 130 and the center section 110 are exaggerated for illustrative purposes only. In the transport mode, the additional sections 120, 130 are first decoupled from the center section 110, and may be subsequently coupled to each other so that they may be pulled together by the agricultural vehicle 10 or another vehicle.

The center section 110 is designed to have a width W110 that is approximately the width W10 of the agricultural vehicle 10. However, it is conceivable to have a width W110 of the center section 110 that is larger or smaller than the width W10 of the agricultural vehicle 10. Because the widths W110 and W10 are approximately the same, the roadway concerns with an oversized header are avoided; and thereby, the center section 110 may remain attached to the agricultural vehicle 10 during transport. For example, the width W110 of the center section 110 can be 15 ft. or less to be within roadway regulations, and the widths W120, W130 of the additional sections 120, 130 can be approximately 20 ft. each. This allows the sectional header system 100 to have a much larger operational width W100, for example 55 ft., while still providing for a compact and simple means of transportation. In this regard, any combination of additional sections 120, 130, including two or more additional sections having the same or different widths, could be used to obtain a desired operational width W100 of the sectional header system 100, all while working off the common center section 110.

Figure 5:
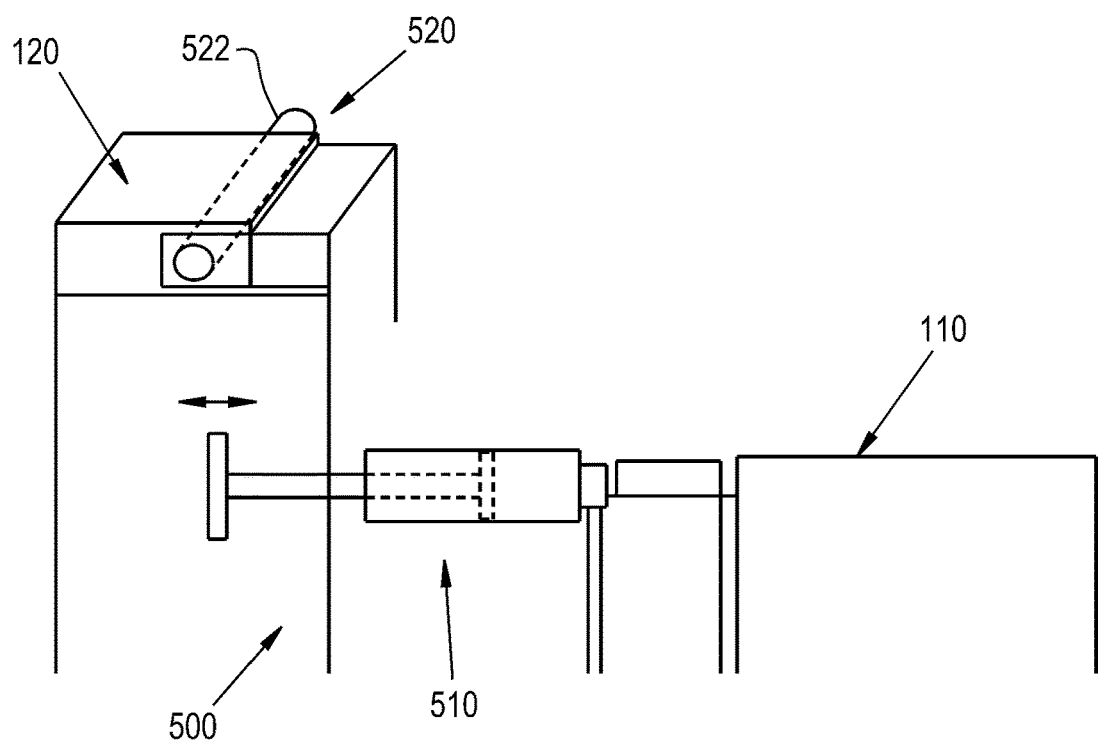
FIG. 5 is a schematic representation of an embodiment of a coupling assembly in accordance with the exemplary embodiment of the present invention.
Figure 6:
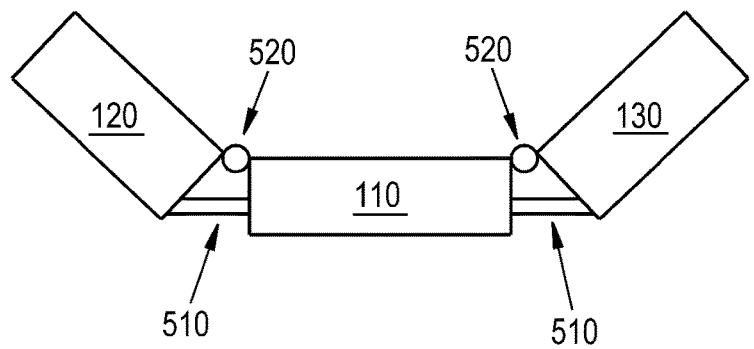
FIG. 6 is a schematic representation of the sectional header system in a lifted state in accordance with the exemplary embodiment of the present invention.

Referring now to FIGS. 5-6, there is shown an embodiment of a coupling assembly 500 which selectively and moveably connects the additional sections 120, 130 to the center section 110. The coupling assembly 500 may include at least one actuator 510 and at least one connector 520 for each additional section 120, 130. For example, there may be one actuator 510 and two connectors 520 per additional section 120, 130.

The actuators 510 can be removably connected to the bottom portion of the frame at each lateral end 116A, 116B of the center section 110 and to the respective bottom portions of the frames of the additional sections 120, 130. The actuators 510 can be selectively attached to the additional sections 120, 130 and thereby remain fixed to the center section 110 during transport, or the actuators 510 may be selectively attached to the center section 110 and hence remain on the additional sections 120, 130 during transport.

The actuators 510 are shown to be flotation cylinders, however the actuators 510 may also be any suitable hydraulic or pneumatic cylinders known in the art. A user may manually, selectively activate the actuators 510, or the actuators 510 may be automatically activated if in the form of an electric actuator or other adjustable system operable from within the agricultural vehicle 10. As shown in FIG. 6, the actuators 510 may move the additional sections 120, 130 to place the sectional header system 100 in a lifted state to allow for flex and smooth passage over uneven terrain and upon entering or exiting a field. The actuators 510 may lift the additional sections 120, 130 upwards approximately 15°, 45°, or even 90° relative to the central section 110.

The connectors 520 pivotally connect the respective upper portions of the frames of the center section 110 and the additional sections 120, 130 such that the additional sections 120, 130 pivot about the connectors 520 when they are lifted. As shown in FIG. 5, the connectors 520 may be in the form of a pin 522 disposed within respective mating holes in each of the frames of the center section 110 and additional sections 120, 130.

Figure 7:
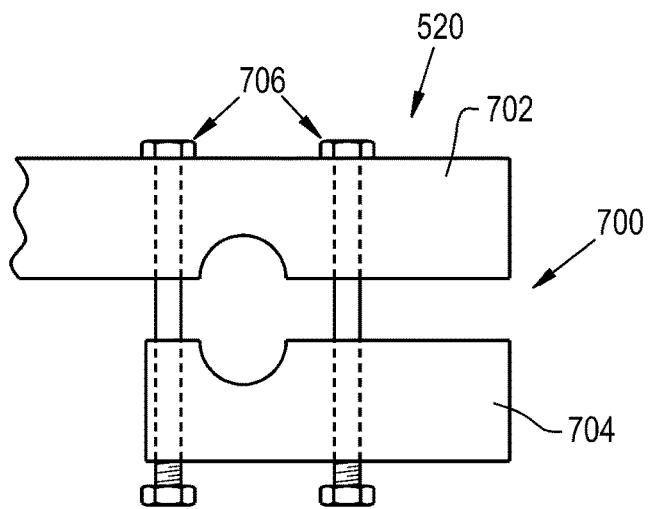
FIG. 7 is a front view of a connector in accordance with the exemplary embodiment of the present invention.
Figure 8:
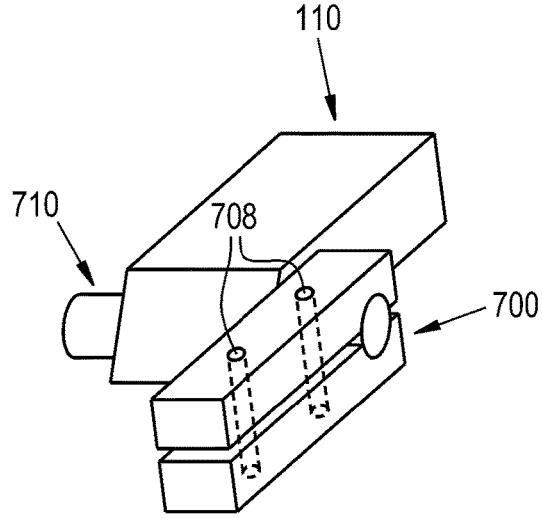
FIG. 8 is a perspective view of the connector as shown in FIG. 7 in accordance with the exemplary embodiment of the present invention.

Additionally, as shown in FIGS. 7-8, the connectors 520 may be in the form of clamps 700 for clamping onto mounts 710 affixed to the center section 110. The clamps 700 include a clamp plate 702, a clamp block 704, and fasteners 706 disposed within respective holes within the clamp plate 702 and block 704. Each clamp plate 702 can be fixedly attached to the additional sections 120, 130 and the clamp block 704 can be adjusted relative to the clamp plate 702 via the fasteners 706 disposed in holes 708 for connecting or disconnecting the additional sections 120, 130. By way of example, FIG. 8 shows only one clamp 700, but in the exemplary embodiment of the present invention there are two clamps 700 for mounting onto the front and back sides of each mount 710 affixed to the center section 110.

According to another aspect of the exemplary embodiment of the present invention, a method is provided for the assembly and disassembly of the sectional header system 100. To convert the sectional header system 100 from the harvesting mode into the transport mode, the center section 110 remains on the agricultural vehicle 10, and the support stabilizers 124, 134 and transport wheels 126, 136 of the additional sections 120, 130 are lowered. The sectional header system 100 can be lowered. Then, the coupling system 500 is disconnected so that the center section 110 on the agricultural vehicle 10 can be freely moved. At this point the additional sections 120, 130 may remain apart or be linked together in order to move them separately or together as a single unit. If the additional sections 120, 130 are linked together, the additional section 120 is first hooked onto the agricultural vehicle 10 or other vehicle and its support stabilizer 124 is raised. The additional section 120 is backed up to the additional section 130. The additional section 130 is hooked up to the additional section 120, thereby making the additional sections 120, 130 a single unit. The support stabilizers 134 on the additional section 130 are raised, and the single unit of additional sections 120, 130 is ready to be transported. Thereby, the additional sections 120, 130 and the center section 110, which is still attached to the agricultural vehicle 10, can be easily and efficiently moved to a new location. It is also conceivable to decouple the center section 110 from the agricultural vehicle 10 to be transported in a conventional manner if desired.

To convert the sectional header system 100 from transport mode to harvesting mode, the reverse order of the above described method occurs. The additional section 130 is first set in place and its support stabilizer 134 is engaged. The additional section 130 is either unhitched from the additional section 120 or from the another vehicle if pulled separately. The additional section 120 may also be placed in the field in a likewise manner. Next, the agricultural vehicle is moved into place to connect one of the additional sections 120, 130 first or together at the same time. The respective coupling assembly 500 is connected to each of the additional sections 120, 130. Additionally, at this point, the actuators 510 may be extended or hooked up to pull either of the additional sections 120, 130 into position. The center section 110 may then be raised by the agricultural vehicle 10 to lock one of the additional sections 120, 130 together if connected one at a time. Alternatively, the center section 110 may be raised with both of the additional sections 120, 130 to lock both of the additional sections 120, 130 together at one time. Once the coupling assembly 500 is secured and the sectional header system 100 is successfully joined, the agricultural vehicle 10 may then begin harvesting a field.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle, comprising:
   a chassis; and
   a sectional header system carried by the chassis, said sectional header system including:
      a center section connected to the chassis and having a pair of lateral ends;
      at least one additional section; and
      at least one coupling assembly including at least one actuator and at least one connector, said at least one coupling assembly removably connecting the center section to the at least one additional section, wherein the at least one additional section is coupled to the center section in harvesting of a crop material and the at least one additional section is decoupled from the center section in transportation of the sectional header system such that the at least one additional section is entirely disconnectable from the center section and the agricultural vehicle and subsequently towable by the agricultural vehicle or another vehicle in transportation of the sectional header system.

2. The agricultural vehicle according to claim 1, wherein said center section has a width that is approximately the same as a width of the agricultural vehicle.

3. The agricultural vehicle according to claim 1, wherein said center section remains attached to the chassis of the agricultural vehicle in transportation of the sectional header system.

4. The agricultural vehicle according to claim 1, wherein said at least one additional section includes:
   at least one support stabilizer;
   a pair of transport wheels configured to support the at least one additional section in transportation; and
   a tongue configured to connect the at least one additional section to the agricultural vehicle or the other vehicle in transportation.

5. The agricultural vehicle according to claim 1, wherein the sectional header system includes at least two additional sections, each said additional section is respectively coupled to one of said lateral ends of the center section in harvesting, and said at least two additional sections are decoupled from the center section in transportation such that only the center section remains attached to the agricultural vehicle.

6. The agricultural vehicle according to claim 5, wherein in transportation said at least two additional sections are coupled to each other such that they are moveable as a single unit.

7. The agricultural vehicle according to claim 1, wherein said at least one additional section can pivot with respect to the center section in harvesting.

8. The agricultural vehicle according to claim 1, wherein said at least one actuator is configured for moving the at least one additional section to be in a lifted state, said at least one connector pivotally connecting said center section and said at least one additional section such that actuation of the at least one actuator causes the at least one additional section to pivot about the at least one connector.

9. The agricultural vehicle according to claim 1, wherein said at least one actuator is in the form of at least one flotation cylinder and said at least one connector is in the form of at least one clamp.

10. A sectional header system, comprising:
    a center section having a pair of lateral ends;
    at least one additional section; and
    at least one coupling assembly including at least one actuator and at least one connector, said at least one coupling assembly removably connecting the center section to the at least one additional section, wherein the at least one additional section is coupled to the center section in harvesting of a crop material and the at least one additional section is decoupled from the center section in transportation of the sectional header system such that the at least one additional section is entirely disconnectable from the center section and the agricultural vehicle and subsequently towable by the agricultural vehicle or another vehicle in transportation of the sectional header system.

11. The sectional header system according to claim 10, wherein said center section is attachable to the agricultural vehicle and said center section remains attached to the agricultural vehicle in transportation of the sectional header system.

12. The sectional header system according to claim 11, wherein said center section has a width that is approximately the same as a width of the agricultural vehicle.

13. The sectional header system according to claim 10, wherein the at least one additional section includes:
    at least one support stabilizer;
    a pair of transport wheels configured to support the at least one additional section in transportation; and
    a tongue configured to connect the at least one additional section to the agricultural vehicle or the other vehicle in transportation.

14. The sectional header system according to claim 10, wherein the sectional header system includes at least two additional sections, each said additional section is respectively coupled to one of said lateral ends of the center section in harvesting, and said at least two additional sections are decoupled from the center section in transportation such that only the center section remains attached to the agricultural vehicle.

15. The sectional header system according to claim 14, wherein in transportation said at least two additional sections are coupled to each other such that they are moveable as a single unit.

16. The sectional header system according to claim 10, wherein said at least one additional section can pivot with respect to the center section in harvesting.

17. The sectional header system according to claim 10, wherein said at least one actuator is configured for moving the at least one additional section to be in a lifted state, said at least one connector pivotally connecting said center section and said at least one additional section such that actuation of the at least one actuator causes the at least one additional section to pivot about the at least one connector.

18. The sectional header system according to claim 10, wherein said at least one actuator is in the form of at least one flotation cylinder and said at least one connector is in the form of at least one clamp.

19. A method, comprising the steps of:
providing a sectional header system for an agricultural vehicle, said sectional header system including:
  a center section having a pair of lateral ends;
  at least one additional section; and
  at least one coupling assembly including at least one actuator and at least one connector, said at least one coupling assembly removably connecting the center section to the at least one additional section, wherein the at least one additional section is coupled to the center section in a harvesting mode and the at least one additional section is decoupled from the center section in a transportation mode for transporting the sectional header system such that the at least one additional section is entirely disconnectable from the center section and the agricultural vehicle and subsequently towable by the agricultural vehicle or another vehicle for transporting the sectional header system;
converting the sectional header system from the harvesting mode into the transportation mode by disconnecting said at least one additional section from said center section such that only the center section remains attached to the agricultural vehicle; and
converting the sectional header system from the transportation mode into the harvesting mode by connecting said at least one additional section to said center section.

20. The method according to claim 19, wherein the sectional header system includes at least two additional sections, each said additional section is respectively coupled to one of said lateral ends of the center section in the harvesting mode, and said at least two additional sections are decoupled from the center section in the transportation mode.

* * * * *